(No Model.)
C. TOENNIES.
ROCKING PROPELLER.
No. 319,351. Patented June 2, 1885.
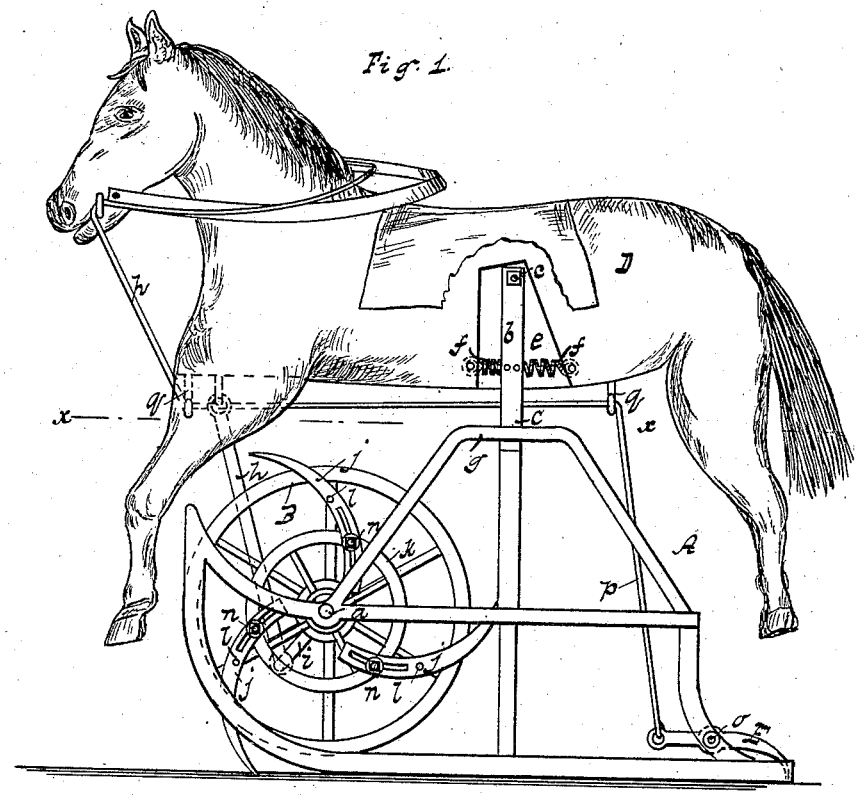
Witnesses:
A. Faber du Faur Jr.
William Miller
Inventor.
Charles Toennies
by Van Santvoord & Hauff
his Attorneys.

UNITED STATES PATENT OFFICE.

CHARLES TOENNIES, OF HOBOKEN, NEW JERSEY.

ROCKING PROPELLER.

SPECIFICATION forming part of Letters Patent No. 319,351, dated June 2, 1885.

Application filed April 30, 1885. (No model.)

*To all whom it may concern:*

Be it known that I, CHARLES TOENNIES, a citizen of Germany, residing at Hoboken, in the county of Hudson and State of New Jersey, have invented new and useful Improvements in Rocking Propellers, of which the following is a specification.

This invention consists in the combination, with a sled, of a rocking device forming a seat, and of a propeller-wheel which is mounted in the sled, and which connects with the rocking device, so that when the rocking device is set in motion a revolving motion is imparted to the propeller-wheel. The propeller-wheel consists of a wheel carrying a series of spurs and an adjusting-ring for setting the spurs. The rocking device is provided with recoil-springs and with a steering-gear, as hereinafter more fully described.

In the accompanying drawings, Figure 1 represents a side elevation. Fig. 2 is a horizontal section in the plane $x$ $x$, Fig 1. Fig. 3 is a detached side view of the propeller-wheel.

Similar letters indicate corresponding parts.

In the drawings, the letter A designates a sled, the frame of which forms the bearings for a shaft, $a$, on which is mounted the propeller-wheel B. On the sled-frame is firmly secured a structure, C, from which extend two standards, $b\ b$, which form the bearings for a rock-shaft, $c$, and on this rock-shaft is firmly mounted the rocking device D. In the example shown in the drawings this rocking device is made in the form of a horse; but it may be made in any other form or shape suitable for the purpose. The standards $b\ b$ extend into cavities $e$ in the sides of the rocking device, and in these cavities are situated recoil-springs $f\ f$, which serve to ease the rocking motion. The rocking device forms a seat for a rider, and the top bars, $g$, of the structure C form the supports for the rider's feet. The rocking device D connects with the propeller-wheel in such a manner that when motion is imparted to the rocking device the propeller-wheel is caused to revolve. The connections shown in the drawings consist of a rod, $h$, which extends from the rocking device to a crank, $i$, formed in the shaft $a$; but any suitable connections may be substituted for these devices. The recoil-springs $f\ f$ assist in carrying the propeller over the dead-centers. The propeller-wheel B carries a series of spurs, $j\ j$, and an adjusting-ring, $k$. The spurs $j\ j$ swing on pivots $l$, and they are provided with segmental slots $m$, which engage with pivots $n$, secured in the adjusting-ring $k$. By turning this ring in the direction of the arrow marked on it in Fig. 3 the spurs are gradually moved in, and as they reach the position shown in dotted lines in said figure they are thrown out of action. To the rear end of the sled-frame are secured, by pivots $o$, the steering-teeth E. To the tail ends of these teeth are secured ropes or cords $p$, which extend to loops or staples $q$, secured to the rocking device, so that they can be easily reached and manipulated by the rider occupying the seat of the rocking device. By pulling either of these cords the corresponding steering-tooth is depressed into the snow or ice, and the direction in which the sled moves forward is correspondingly changed, and if both cords are pulled both steering-teeth are depressed and the forward movement of the sled is checked.

What I claim as new, and desire to secure by Letters Patent, is—

1. The combination, with a sled, of a rocking device forming a seat, a propeller-wheel which is mounted in the sled, and suitable connections for transmitting motion from the rocking device to the propeller-wheel, substantially as described.

2. The combination, with the sled and with the rocking device, of standards $b\ b$, rising from the sled-frame, cavities $e$ formed in the rocking device for the reception of the standards, recoil-springs situated in said cavities, the propeller-wheel mounted in the sled-frame, and the connections for transmitting motion to the propeller-wheel, substantially as described.

3. The combination, with the sled, of a structure, C, rising from the sled-frame to form a support for the rider's feet, the standards $b\ b$, rising from this structure, the rocking device mounted in these standards, the propeller-wheel mounted in the sled-frame, and the connections for transmitting motion from the rocking device to the sled-frame, substantially as described.

4. The combination, with the sled-frame, of the rocking device mounted in standards rising from the sled-frame, the propeller-wheel mounted in the sled-frame, and the connections for transmitting motion from the rocking device to the propeller-wheel, the steering-teeth carried by the sled-frame, and the cords $p$, for governing these steering teeth, substantially as described.

In testimony whereof I have hereunto set my hand and seal in the presence of two subscribing witnesses.

CHARLES TOENNIES. [L. S.]

Witnesses:
W. HAUFF,
E. F. KASTENHUBER.